United States Patent Office 3,185,658
Patented May 25, 1965

3,185,658
NON-SETTLING NEOPRENE-MODIFIED
PHENOLIC RESIN ADHESIVES
Robert Roth Garrett, Wilmington, Del., assignor to E. I. du Pont de Nemours and Company, Wilmington, Del., a corporation of Delaware
No Drawing. Filed Apr. 12, 1962, Ser. No. 186,857
8 Claims. (Cl. 260—31.8)

This invention relates to improved neoprene-modified resin cement compositions which do not stratify during storage or use. This invention further relates to a process for the preparation of the improved cement compositions.

It is known that neoprene cements containing modified resins, prepared by reacting magnesium oxide with certain phenol-formaldehyde resins, have high cohesive strength at elevated temperatures as well as at room temperature. Unfortunately, these adhesives tend to stratify over a period of time into a clear liquid phase over a layer containing flocculated and sedimentary solids. The tendency for stratification to occur depends partially on the manner in which the cement is prepared, the type of polychloroprene which is employed, and the composition of the solvent used for dissolving the neoprene and the modified resin components; but even when all of these variables are optimized, some samples of the cement will still stratify during storage. In those cement applications which require the use of neoprene types and solvent systems other than those which minimize this problem, phasing is a continually annoying problem.

Phasing does not permanently damage neoprene modified resin adhesives since the stratified cements can be restored to their original condition by agitation to disperse and resuspend the settled material. However, mixing the cement before it is used is troublesome and time consuming, especially if large containers of adhesive are involved. If a container of stratified material is inadvertently used without first being thoroughly agitated, the composition and the consistency of the adhesive and the strength of the bond which it produces will vary considerably as the contents of the container are consumed.

It is an object of this invention to provide improved neoprene-modified resin compositions which overcome the disadvantages hereinbefore described. More particularly, it is an object of this invention to provide improved polychloroprene-modified resin cement compositions in the form of adhesive solutions which do not stratify during storage or use. It is a further object of this invention to provide a process for preventing stratification of adhesive solutions containing polychloroprene and a modified resin. Other objects will appear hereinafter.

These and other objects are accomplished by the following improved composition which comprises: 100 parts by weight of polychloroprene dissolved in a volatile organic solvent, 45 to 50 parts by weight of a magnesium salt of a resin made by reacting from 1 to 2 moles of formaldehyde with 1 mole of a substituted phenol in which the substitutents are aryl radicals and alkyl radicals containing from 3 to 6 carbon atoms, and from 1 to 40 parts by weight of an organic acid containing at least one carboxyl group.

To prepare the improved compositions, the polychloroprene and resin, the latter before or after modification, are mixed in volatile solvent and then the organic acid is added and blended therewith. The resulting adhesive solution does not stratify during storage or use.

The terms "polychloroprene" and "neoprene" are used interchangeably. U.S.P. 2,918,442 describes the praparation of neoprene-modified resin solvent adhesives containing magnesium oxide modified phenolic resins.

Any soluble polychloroprene which is normally used in the preparation of conventional neoprene-modified resin solvent adhesives can be used to prepare the novel adhesive compositions of this invention. This includes commercially available types of neoprene such as the slow crystallizing type G neoprenes, the type W neoprenes which have moderately rapid rates of crystallization and the quick crystallizing neoprene types AC and AD. While some of these types of polychloroprene are readily soluble in suitable solvent mixtures, others, notably types CG, GN and AC, may require a limited amount of milling to form smooth solutions readily. Description of the foregoing types of neoprene is available in the book, The Neoprenes, by N. L. Catton (1953). Referring to page 3 of this book, the neoprene types G, including type GN, and W are generally delineated as the sulfur-modified and non-sulfur modified types, respectively, with the sulfur-modified types requiring only metallic oxides for vulcanization and the non-sulfur modified types requiring both metallic oxides and accelerators to develop suitable cures. Neoprene type AC is described on page 87 as being a non-sulfur modified type; type CG is a sulfur-modified type (page 91). Comparison of neoprene types AC and AD is given on pp. 173–178 of Synthetic Rubber Technology, vol. 1, W. S. Penn (1960), Maclaren & Sons, Ltd., London. A typical procedure for the polymerization of chloroprene in the presence of sulfur to obtain the sulfur-modified type GN is described in Synthetic Rubber, G. S. Whitby (1954), Wiley & Sons, Inc., p. 770; neoprene type W does not contain sulfur (page 772). Neoprene types such as CG and AC are prepared by variations in the method of manufacture of type GN, Synthetic Rubber, supra, p. 771. The neoprene types referred to above are obtainable from E. I. du Pont de Nemours & Company, Inc., Wilmington, Delaware.

The magnesium oxide modified resins required to prepare the adhesives of this invention are prepared from phenolic resins which in turn are made by reaticng 1–2 moles of formaldehyde with 1 mole of a para-substituted phenol in the presence of an alkaline catalyst. Aryl substituted phenols such as p-phenylphenol or p-tolyl-phenols may be used in the formaldehyde condensation. Phenols substituted with alkyl radicals containing 3–6 carbon atoms, such as p-tertiary-butyl phenol, p-isopropyl phenol and p-tertiary-amyl phenol are especially useful. Of all these substituted phenols, p-tertiary-butyl phenol is preferred as a reactant in the formaldehyde condensation. Procedures for modifying these resins with magnesium oxide so as to produce the magnesium salt will be described hereinafter.

Polychloroprene formulations or compounds usually contain minor proportions of stabilizing ingredients such as magnesium oxide and zinc oxide which serve as strong acid acceptors and improve aging characteristics. These representative compounds can be used in the novel adhesive compositions of this invention in amounts of 4–10 parts of zinc oxide and 2–4 parts of magnesium oxide per 100 parts of polychloroprene. In addition to the functions of the metal oxides which have already been mentioned, zinc oxide slowly vulcanizes deposited films of neoprene adhesives at room temperature without interfering with the stability of the adhesive solution. The quantities of zinc and magnesium oxides suggested above are adequate to prevent the deposited polychloroprene film from evolving strong acid. More than 10 parts of zinc oxide may reduce the stability of the adhesive solution by causing slow vulcanization even at room temperature. More than 4 parts of magnesium oxide can be used in preparing the adhesives of this invention, but the additional material serves no purpose and may interfere with the formation of good bonds when the adhesive is used. Other well known curing agents can be added to the novel adhesive composition of this invention to increase the curing rate of the polychloroprene.

A large number of solvents or solvent mixtures can be used to dissolve soluble polychloroprenes for the preparation of solvent adhesives. Mixed solvents are usually preferred since they permit greater control of such properties of adhesives as viscosity and drying characteristics. Aromatic hydrocarbons, such as toluene and xylene, either alone or in blends with other types of compounds are excellent solvents for polychloroprene. Aliphatic hydrocarbons, ketones, esters and chlorinated hydrocarbons are useful classes of solvents for preparing solvent blends for neoprene adhesives. The following blends are representative of the solvents which can be used in preparing the adhesives of this invention. The composition of the blends is indicated in parts by volume.

| | |
|---|---|
| Toluene | 1 |
| Hexane | 1 |
| Ethyl acetate | 1 |
| Toluene | 3 |
| Hexane | 3 |
| Ethyl acetate | 3 |
| Trichloroethylene | 1 |
| Acetone | 3 |
| Heptane | 7 |
| Toluene | 2 |
| Ethyl acetate | 8 |
| Toluene | 1 |
| Methyl ethyl ketone | 1 |
| Hexane | 1 |

Solvents based wholly on straight aromatic hydrocarbons or solvents high in aromatic hydrocarbons show the least tendency toward stratification; however, aromatic hydrocarbon solvents are relatively toxic materials. Sufficient solvent to dissolve the polychloroprene and modified resin should be used. Solutions of 3–10 parts by weight of solvent to one part of polychloroprene are useful.

All of the ingredients described up to this point are generally used in the preparation of conventional neoprene solvent adhesives containing magnesium oxide modified phenolic resins. Generally solids are present in conventionally prepared adhesive solutions of the subject type resulting from some of the components of the adhesives or fillers added. The essential feature of the present invention lies in the addition of about 1–40 parts of an organic acid containing at least one carboxyl group per 100 parts of soluble polychloroprene to prevent settling of these solids and the hereinbefore described accompanying deficiencies. A wide variety of organic acids, including monobasic and polybasic acids, unsubstituted and substituted, derived from aliphatic or aromatic nuclei, may be used in the present invention. Typical aliphatic monobasic acids include such materials as formic, acetic, propionic, octanoic (caprylic), 2-ethyl hexanoic (substituted caproic), and decanoic (capric) acids. Aliphatic monobasic acids containing about 4–6 carbon atoms are effective in the present invention, but are not recommended because of the strong, disagreeable odor which may be associated with them. Typical dibasic aliphatic acids which may be used are represented by compounds such as oxalic acid, succinic acid, adipic acid, sebacic acid, suberic acid and azelaic acid. Suitable aromatic acids include compounds such as benzoic acid, toluic acid, phthalic acid, terephthalic acid, and p-chlorobenzoic acid. Other representative polybasic acids include compounds such as trimellitic acid, pyromellitic acid and even polymeric acids of which polyacrylic acid is an example. The acids that can be used are by no means meant to be restricted by the representative examples given above, and one skilled in the art should have no difficulty in suggesting other suitable acids.

The quantity of organic acid required to produce the non-stratifying adhesives of this invention varies from about 1–40 parts per 100 parts of polychloroprene. The amount of acid required depends to a large extent on the molecular weight of the particular acid being used. With low molecular weight acids such as formic acid and oxalic acid, the stabilizing effect is evidenced at concentrations as low as 1 part per 100 parts of polychloroprene. With higher molecular weight acids, as much as 5–10 parts per 100 parts of polychloroprene may be required to prevent significant settling. Preferred concentrations of low molecular weight acids range from about 1–10 parts, while preferred concentrations for higher molecular weight acids are in the range of 10–30 parts. While greater than 40 parts of organic acid can be used, this is generally not necessary to prevent stratification. With low molecular weight acids, incorporation of excessive amounts may lead to gelation with subsequent syneresis. Furthermore, excessive amounts of acid may cause a reduction in the bond strength of the adhesives.

The manner in which the organic acid checks phasing within the adhesives of this invention is not known for certain; however, it appears that the acid makes the cement thixotropic which in turn prevents the solids which are present from settling. As indicated above, certain cements may approach a gelled condition, but it should be noted that this is reversible, i.e. physical, gelling which is eliminated by stirring as opposed to irreversible, i.e. chemical, gelling which is caused by curing or vulcanization, primarily due to agents added for this purpose, of the polychloroprene in the adhesive. This thickening of the cement does not interfere with its application since the action of spreading the cement with a brush or spatula is sufficient to thin the material to a fluid state similar to that which the cement would exhibit in the absence of the organic acid. Additional but unknown factors also appear to be involved since organic acid containing formulations which resist stratification have been prepared which show almost negligible increases in Brookfield viscosity.

The novel adhesives of this invention are most easily prepared by adding the organic acid, which prevents settling within the adhesive solution, to a polychloroprene solvent adhesive which has been prepared by conventional procedures. Adhesives containing magnesium oxide modified resins are preferably prepared by first reacting the resin with the magnesium oxide in at least a portion of the solvent to be used in the final adhesive. Additional solvent if required and polychloroprene are then added to the modified resin solution along with, if desired, zinc oxide and additional magnesium oxide, or other conventional stabilizing ingredients for the polymer used. This procedure of pre-reacting the resin with magnesium oxide in many cases produces adhesive which show the least tendency toward stratification. With certain types of neoprene, however, this pre-reacting procedure may adversely affect stratification behavior. Incorporation of organic acids prevents stratification whether or not the pre-reaction procedure is employed, and preparation of the adhesives of this invention is not limited to the pre-reaction procedure.

Conventional polychloroprene-modified resin adhesives can also be made by adding the polychloroprene base along with zinc and magnesium oxides to the solvent followed by the addition of the unmodified resin. In this case the entire mixture is agitated until the modification reaction is completed. Another procedure consists of adding the polychloroprene base and resin simultaneously to the solvent along with magnesium and zinc oxides and agitating the entire mass until solution of the base and resin is effected. Settling of solid material within the cements prepared by these last two procedures is also prevented by the addition of organic acid.

The organic acid stabilizer is best added to the conventional unstable adhesive while it is still in the mixing equipment used for cement preparation. Liquid organic acids can be added directly to the conventional adhesive solution and the entire mixture agitated to insure homogeneity. Solid acids may be added directly, or in the form of a solution made up with a portion of the solvent to be employed in the final adhesive solution. If solid acid is employed without first being dissolved, care should be exercised that the mixture is agitated for a sufficient length of time to permit solution and blending into the adhesive solution. Where organic acids which are insoluble in the mixed cement solvent are employed, it is necessary that these acids be finely powdered. This invention is not restricted to organic acids which are soluble in the whole cement. The organic acid can be added at temperatures ranging from about 20–60° C. Lower temperatures are not preferred because of the relatively high viscosity which polychloroprene adhesives display under these conditions. Higher temperatures increase the vapor pressure of the solvent in the mixture which may result in some loss of solvent. Once the acid has been thoroughly incorporated, the adhesive may be packed into suitable containers.

While the most convenient procedure for adding the organic acid consists of adding it during the course of the adhesive preparation, it may be added at any time to conventional adhesives once the polychloroprene base and modified resin are in solution. Thus, the acid can be added to cements made several weeks or months previously and still bring about stabilization. Naturally it is important that the acid be mixed thoroughly into the adhesive.

It is not preferred to add the acid during the preparation of the adhesive prior to the formation of the modified resin from magnesium oxide and the resin, since the acid may interfere with the oxide-resin reaction.

Representative examples of the invention are as follows. Parts are by weight unless otherwise indicated.

Example 1

A neoprene-modified resin solvent adhesive is prepared in the following manner. The polychloroprene base for the adhesive is prepared by milling together on a conventional rubber mill (a) 100 parts of quick crystallizing polychloroprene (prepared by polymerization of chloroprene at 10° C. in the presence of an alkyl mercaptan modifier), (b) 4 parts magnesium oxide, (c) 5 parts zinc oxide, and (d) 2 parts 2,6-di-tertiary-butyl-4-phenylphenol antioxidant. About 111 parts of this base (which contains 100 parts of polychloroprene) is placed in a churn with a mixed solvent consisting of 192 parts of hexane, 192 parts ethyl acetate and 64 parts of trichloroethylene. The mixture is agitated in the churn until it has a smooth appearance. In a separate agitated vessel is placed (e) 45 parts of phenolic resin prepared by condensing between 1–2 moles of formaldehyde with 1 mole of p-teritary-butyl phenol, (f) 4 parts magnesium oxide, (g) 192 parts of toluene, and (h) 0.5 part of water. This latter mixture is agitated at room temperature for 1–2 hours to permit the magnesium oxide to react with the resin and then added in its entirety to the previously prepared solution of the polychloroprene base. The final mixture is blended in the churn until it has a smooth, creamy appearance. For convenience, this adhesive will be referred to as Adhesive A.

Equal volumes of Adhesive A are placed in three cylindrical containers. About 2 parts of finely powdered terephthalic acid per 100 parts of Adhesive A is added and mixed into the contents of one container at room temperature. In a similar fashion, 2 parts of finely powdered sebacic acid is added per 100 parts of Adhesive A to a second container. These amounts of acid correspond to about 16 parts of acid per 100 parts of polychloroprene. The third container without any additive serves as a control.

The three containers are sealed tightly and stored at 60° C. The elevated temperature is employed to accelerate the rate at which stratification occurs. At the end of 18 hours, the control has settled so that a clear layer of liquid ¼-inch in depth has formed over a layer of creamy appearance. The sample containing terephthalic acid shows no evidence of settling, while the sample containing sebacic acid shows only a very thin line of clear meniscus on its top surface. After an additional 6 hours at 60° C., the control shows equal volumes of clear liquid and flocculated solids, while the samples containing the acids show no change as indicated by the absence of an appreciable amount of clear liquid phase and the continued presence throughout the bulk of the sample of apparently uniformly dispersed particles. These mixtures are nearly indistinguishable to the eye from the original Adhesive A as it appeared shortly after mixing. The addition of acid causes little change in appearance except for a slight lightening of the original yellowish color.

Example 2

Five samples of Adhesive A containing varying amounts of sebacic acid are placed in containers as in Example 1. The sebacic acid is added and blended into the samples at room temperature. The samples are allowed to stand at room temperature for about 110 days and the amount of settling determined by measuring the depth of the clear liquid layer and the depth of the layer of flocculated solids. The degree of settling can be expressed conveniently by the following formula:

$$\text{Degree of settling} = \frac{\text{Depth of clear liquid}}{\text{Depth of clear liquid} + \text{depth of flocculated solid}} \times 100$$

Concentrations of sebacic acid employed and the degree of settling observed after 110 days are tabulated below.

| Concentration of acid, parts/100 parts polychloroprene: | Degree of settling |
|---|---|
| 0.8 | 70 |
| 4.0 | 30 |
| 8.0 | 20 |
| 16.0 | 5 |
| 40.0 | 0 |

Example 3

Six samples of Adhesive A are prepared in cylindrical containers as in Example 1. One of these samples serves as a control. To the remaining five samples are added 16 parts of various organic acids per 100 parts of polychloroprene. The acids are added and blended in at room temperature. The control and the five containers with added organic acids are sealed tightly and stored for 16 hours at 60° C. to accelerate the rate of settling. At the end of this time the samples are examined and the degree of settling as expressed in Example 2 determined. The organic acids used in these samples and the corresponding degrees of settling are presented in the following table.

| Organic acid additive: | Degree of settling |
|---|---|
| None—Control | 10 |
| Suberic | 0 |
| Oxalic | 0 |
| Azelaic | 0 |
| Adipic | 0 |
| Capric | 2 |

Example 4

This example demonstrates the effectiveness of adding organic acids to adhesives which are prepared without first separately reacting the magnesium oxide with the phenolic reson. Adhesive B is prepared by placing about 111 parts of polychloroprene base as prepared in Example 1 in a churn, along with hexane, ethyl acetate, toluene, trichloroethylene, phenol-formaldehyde resin and magnesium oxide in the amounts called for in Example 1. The entire mixture is blended in the churn at room temperature until it has a smooth, creamy appearance. The time required to insure that the resin has reacted with the magnesium oxide is about 2–4 hours in the presence of a trace of water as reaction catalyst.

A sample of Adhesive B, with no added organic acid, shows appreciable settling in 16 hours. Adhesive B plus 16 parts oxalic acid per 100 parts of polychloroprene shows no gross settling after 3 days and has the appearance of a tight thixotropic gel. A portion of this material when stirred gives a pourable liquid. After 2 more days of standing, the pourable liquid has again formed a thixotropic gel and exhibits no stratification.

*Example 5*

Two samples of Adhesive B are placed in cylindrical containers as in Example 1, and to one of these is added 5.6 parts of 98% formic acid per 100 parts of polychloroprene. The samples are allowed to stand at room temperature for one month. At the end of this period, the degree of settling as expressed in Example 2 is 50 in the control sample and 0 in the sample containing the formic acid.

*Example 6*

Two samples of Adhesive A are placed in cylindrical vessels and to one of these is added 8 parts of oxalic acid at room temperature. The samples are sealed and stored at 25° C. for 39 days. At the end of this time the control shows a degree of settling of 72 while the sample containing oxalic acid shows a degree of settling of 5.

Both samples are agitated to give uniform mixtures and peel adhesion is measured in the following way. Two 1-inch strips of unsized No. 10 canvas duck are each coated with three coats of the test adhesive, allowing about 30 minutes between coats. Before the last coat is dry, the assemblies are firmly rolled together with a steel hand roller to guarantee good contact. One end of the canvas strips is left uncoated so that the assembly may be attached to a testing machine. The test assemblies are pulled at a rate of two inches per minute and the force required to separate the canvas pieces is measured. When pulled at a temperature of 25° C., the control adhesive shows a peel adhesion of 25 p.p.l.i. (pounds per linear inch), while the sample containing oxalic acid gives a value of 22 p.p.l.i. When the samples are pulled at 60° C., the control shows 13 p.p.l.i. and the sample containing oxalic acid, 11 p.p.l.i.

In addition to the organic acids employed in the preceding Examples 1 to 6, other acids representatively previously listed containing at least one carboxyl group are similarly applicable to improving the storage and use characteristics of neoprene-modified resin solution adhesives hereinbefore described.

As many widely different embodiments of this invention may be made without departing from the spirit and scope thereof, it is to be understood that this invention is not limited to the specific embodiments thereof except as defined in the appended claims.

What is claimed is:

1. A non-settling adhesive cement composition comprising (a) 100 parts by weight of polychloroprene dissolved in volatile organic solvent, (b) 45 to 50 parts by weight of a magnesium salt of a resin made by reacting, in the pressure of an alkaline catalyst, from 1 to 2 moles of formaldehyde with 1 mole of a para substituted phenol in which the substituent is a hydrocarbon radiacl selected from the group consisting of aryl radicals and alkyl radicals containing from 3 to 6 carbon atoms, (c) 1 to 40 parts by weight of an organic carboxylic acid containing at least one carboxyl group, and (d) a minor proportion of stabilizing ingredients.

2. A non-settling adhesive cement composition comprising (a) 100 parts by weight of polychloroprene dissolved in volatile organic solvent, (b) 45 to 50 parts by weight of a magnesium salt of a resin made by reacting, in the presence of an alkaline catalyst, from 1 to 2 moles of formaldehyde with 1 mole of a para substituted phenol in which the substituent is a hydrocarbon radical selected from the group consisting of aryl radicals and alkyl radicals containing from 3 to 6 carbon atoms, (c) 1 to 40 parts by weight of an organic carboxylic acid containing at least one carboxyl group, (d) 4 to 10 parts by weight of zinc oxide, and (e) 2 to 4 parts by weight of magnesium oxide.

3. The non-settling adhesive cement composition of claim 2 wherein the organic carboxylic acid is aliphatic.

4. The non-settling adhesive cement composition of claim 2 wherein the organic carboxylic acid is aromatic.

5. The non-settling adhesive cement composition of claim 2 wherein the organic carboxylic acid is adipic acid.

6. The non-settling adhesive cement composition of claim 2 wherein the organic carboxylic acid is oxalic acid.

7. The non-settling adhesive cement composition of claim 2 wherein the substituted phenol is p-tertiarybutyl phenol.

8. A non-settling adhesive cement composition comprising (a) 100 parts by weight of polychloroprene dissolved in volatile organic solvent, (b) 45 to 50 parts by weight of a magnesium salt of a resin made by reacting, in the presence of an alkaline catalyst, from 1 to 2 moles of formaldehyde with 1 mole of a para substituted phenol in which the substituent is a hydrocarbon radical selected from the group consisting of aryl radicals and alkyl radicals containing from 3 to 6 carbon atoms, and (c) 1 to 40 parts by weight of an organic carboxylic acid containing at least one carboxyl group.

References Cited by the Examiner

UNITED STATES PATENTS

| | | | |
|---|---|---|---|
| 2,343,558 | 3/44 | Kirby et al. | 260—31.8 XR |
| 2,664,413 | 12/53 | Parker | 260—45.85 XR |
| 2,918,442 | 12/59 | Gerrard et al. | 260—29.3 |
| 2,951,777 | 9/60 | Zimmerman | 260—31.8 |

ALEXANDER H. BRODMERKEL, *Primary Examiner.*

LEON J. BERCOVITZ, MORRIS LIEBMAN,

*Examiners.*